Aug. 7, 1923.

W. T. FISHLEIGH 1,463,944

TRACTOR ATTACHMENT

Filed Feb. 13, 1922

WITNESS:

J. M. Cahill

INVENTOR.
Walter T. Fishleigh
BY
E. L. Davis
ATTORNEY.

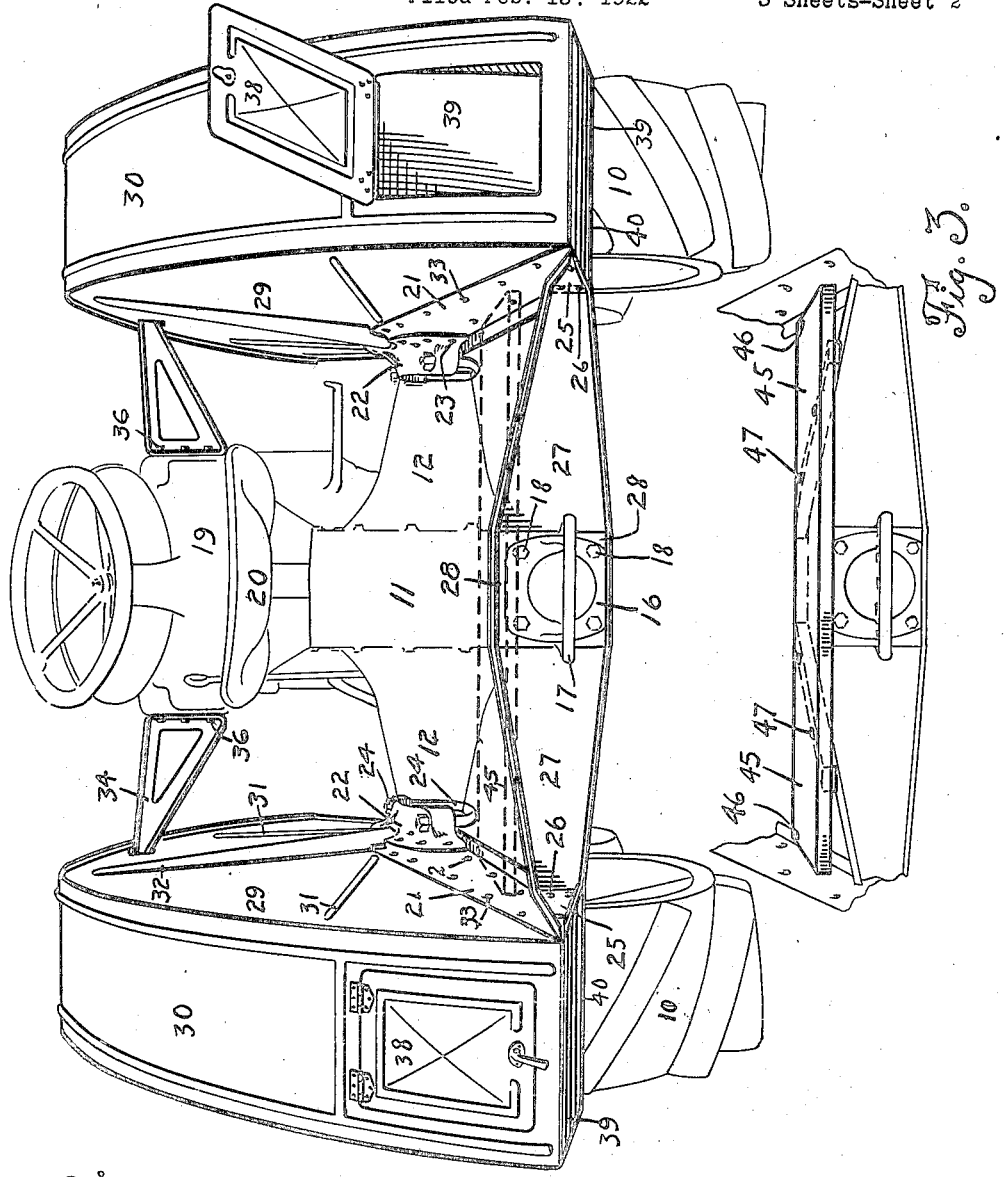

Aug. 7, 1923.
W. T. FISHLEIGH
TRACTOR ATTACHMENT
Filed Feb. 13, 1922
1,463,944
3 Sheets-Sheet 3
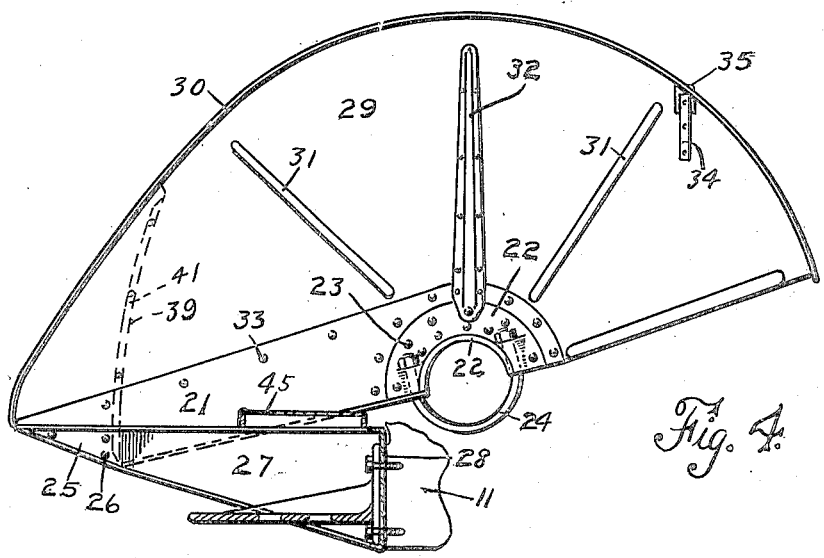
Fig. 4.
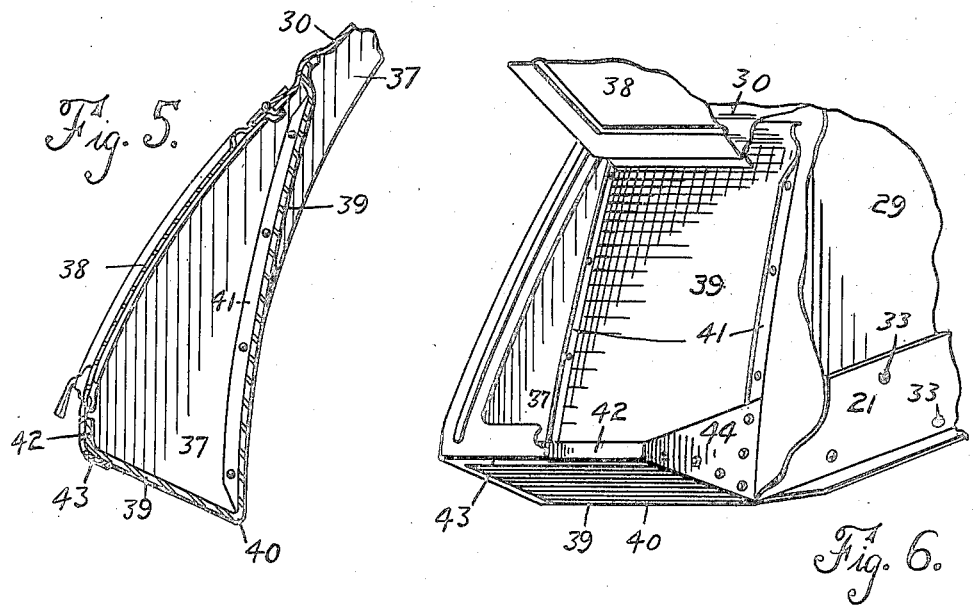
Fig. 5.
Fig. 6.
WITNESS:
J. M. Cahill
INVENTOR.
Walter T. Fishleigh
BY E. L. Davis.
ATTORNEY.

Patented Aug. 7, 1923.

1,463,944

UNITED STATES PATENT OFFICE.

WALTER T. FISHLEIGH, OF DETROIT, MICHIGAN, ASSIGNOR TO FORD MOTOR COMPANY, OF DETROIT, MICHIGAN, A CORPORATION OF DELAWARE.

TRACTOR ATTACHMENT.

Application filed February 13, 1922. Serial No. 535,992.

*To all whom it may concern:*

Be it known that I, WALTER T. FISHLEIGH, a citizen of the United States, residing at Detroit, in the county of Wayne and State of Michigan, have invented new and useful Improvements in Tractor Attachments, of which the following is a specification.

The object of my invention is to provide new and useful attachments for tractors, of simple, durable, and inexpensive construction.

A further object of my invention is to provide a tractor attachment for use in connection with commercial tractors which are put out without fenders, tool boxes, or sand pads, and to combine these three functions in one structure which may be readily attached to the tractor. It will be understood that there is at least one type of commercial tractor which is, at the present time, having a large sale and which does not have a frame in the accepted sense of that word, but instead the transmission and crank cases of the engine form the connection between the front and rear axles ordinarily formed by a frame.

A further object of my invention is to provide a tractor attachment of the class described for a tractor which does not have a frame and to provide novel means for attaching the fender to the tractor utilizing the tractor, as built, for the support or attaching means for the fender so that the fender may simply be bolted on to the tractor in its commercial form without material alteration or expense of installation.

A further object of my invention is to provide, in connection with the tractor, a convenient, roomy, and accessible storage place for tools, oil cans, and other such paraphernalia as most operators accumulate for use in connection with the maintenance of a tractor.

A further object of my invention is to provide in connection with the tractor a pad, a foot rest, or the like, which is so mounted and placed that it may serve the double purpose of limiting the amount that the tractor wheels may dig themselves into the soft or sandy ground, and may also prevent the tractor from up-ending or rearing beyond a pre-determined amount.

A further object of my invention is to provide a very strong truss structure for the support of the sand pad mentioned, which will enable the pad to support the weight of the tractor thrown against it without affecting the utility or construction of the tractor and with a minimum weight in proportion to the strength secured.

With these and other objects in view, my invention consists in the arrangement, combination, and construction of the various parts of my improved device, as described in the specification, claimed in my claims, and shown in the accompanying drawings, in which:

Figure 2 shows a rear view of the attachment and the tractor as illustrated in Figure 1.

Figure 3 shows a sectional view of the portion of the parts illustrated in Figure 2 and illustrates the construction of the step used in connection with my improved tractor.

Figure 4 is a vertical central longitudinal sectional view thru my attachment.

Figure 5 shows a vertical central longitudinal sectional view thru a portion of one of the fenders, and illustrates the construction of my improved tool box, and Figure 6 shows one end of one of the fenders in perspective, parts being broken away to better illustrate the construction.

Figure 1:
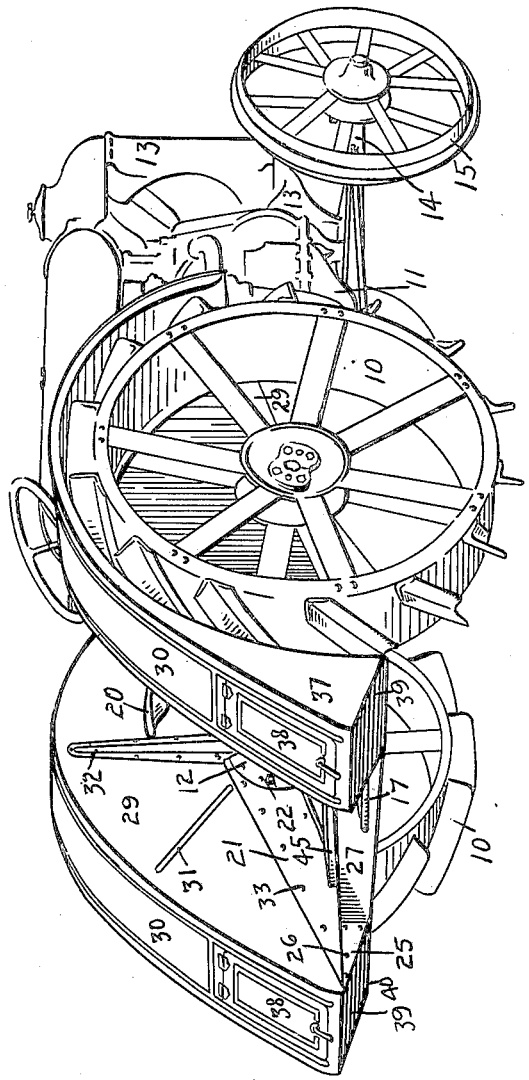
Figure 1 shows a side elevation of a tractor having one embodiment of my invention attached thereto.

Referring to the accompanying drawings, I have used the reference numeral 10 to indicate, generally, the rear wheels of a tractor having a gear casing 11, connecting the rear axle housings 12 with the radiator 13, front axle 14, and front wheels 15, of one form of a widely used commercial tractor.

It will be understood that I have illustrated this tractor for the purpose of illustrating the manner of attachment of my improved attachment to the tractor as changes in the structure of the tractor proper are unnecessary and the installation is thereby facilitated. The rear end of the gear casing 11 of the tractor has an end-cap 16 thereon having an extension 17 which forms the tractor hitch. This cap 16 is secured, in the form of tractor here illustrated, to the gear housing 11 by a plurality of bolts 18. The tractor also has a dash 19 extended upwardly from the transmission housing 11 and a seat 20 mounted on said housing. The other parts of the tractor will not be more particularly mentioned as they do not directly concern my invention by forming an attaching means or the mounting therefor. The sand pad, step, rest, or the like, used in connection with my invention is supported in the following manner from the tractor:

An arm of relatively rigid material 21 of angular cross-section has a semi-circular forging or casting 22 rigidly secured between the end thereof as by means of rivets 23; this casting 22 forms a half ring which is designed to rest upon the rear axle housings 12 adjacent to the wheels 10 of the tractor; a U bolt structure 24 co-acts with the clamping ring 22 to clamp the latter against movement on the rear axle housing 12. It may be mentioned in passing that the arms 21 have a semi-circular portion cut away at their lower edges to correspond with the inner arcs of the half rings 22. A U shaped brace is constructed from relatively heavy steel so that its central portion may be secured to the gear housing 11 and its outer ends secured to the rear ends of the arms. This U brace in the form here shown consists of a tapered channel member having its greatest width at its center which gradually decreases toward its ends. It will be noted that the form shown is not of regular U shape, but instead has its pointed ends 25 substantially parallel with each other and also parallel with the end of the arms 21 so that these end portions 25 may be rigidly secured to the ends of the arms 21, as by rivets or bolts 26. The intermediate portions 27 of the U brace are inclined toward each other, and the central portion 28 lies in planes substantially perpendicular to the planes in which the ends 25 lay.

From the construction of the foregoing parts it will be seen that if a pad or pads are supported at the rear ends of the U brace by the arms 21, then that this pad or pads will form a rest so that in case the tractor should be pulling a load thru soft ground and the wheels should be slipping, then that these wheels could only dig into the ground until the rear end of the tractor came to rest on such pads. Furthermore, these pads will prevent the tractor from over-turning rearwardly as they may be extended to a position close enough to the ground so that when a tractor rears a predetermined amount then that the rear end will come to rest on these sand pads thereby preventing further turning of the tractor.

In the practical use of my invention I have used pads so placed that the tractor may rear only to about thirty degrees before the pads will come in contact with the ground and prevent further rearing.

The U brace is secured to the gear housings 11 by placing the central portion 28 thereof between the cap 16 and the gear housing and then passing the bolts or screws 18 thru the U brace 28 thereby clamping the central portion thereof to the gear housing by the frictional engagement of the cap 16 and also by the position of the screws 18.

By referring to Figure 4 it will be noted that the cap 16 is spaced downwardly and rearwardly somewhat from the axle housing 12.

From the description hereinafter given it will be seen that the forward ends of the arms 21 are supported in position spaced from each other by substantially the width of the tractor, while on the other hand the U brace is supported substantially at the center of the tractor and at a point below the rear axle housings. The benefit, therefore, of a truss structure is secured in a mounting with the pads supported on my attachment against forces tending to move the pads either laterally or about the axis of the housings 12. This double truss structure is highly important in lending rigidity and security to the pad supports with a minimum weight and incumbrance on the tractor in proportion to the strength secured thereby, and required thereof. The construction of the pads which I prefer to use has not been heretofore described as I preferably incorporate them with the fenders which cover the wheels of the tractor indicated by numeral 10. These fenders comprising substantially semi-circular vertical walls 29 have a periphery-surrounding member 30 conforming in curvature to the edge of the vertical walls 29. These vertical walls 29 are preferably reinforced by beadings 31, and at the central vertical portion a brace 32 of semi-circular cross-section is riveted, or otherwise secured to the wall, to form a further brace for the fenders. The periphery-covering member 30 and the vertical wall 29 may have their meeting edges secured together in any suitable manner as by beading or by rolling around a wire for reinforcement. The rear lower edges of the vertical walls 29 are each rigidly secured, as by rivets 33, to the arms 21. Near the forward portion, adjacent to the upper edge of the walls 29, a brace 34 is extended thru the wall 29 and riveted at 35 to the periphery-surrounding member 30; this brace 34 in the form here shown is of triangular shape generally and is secured by screws 36 to the dash 19 of the structure.

From the foregoing description of the fender it will be seen that I have provided a fender which is supported along its rear lower edge where the most strains and impacts will be received, by the pad-supporting arm 21 which is of relatively heavy material, and at its forward portion the fender is supported by the brackets 34 secured to the dash of the vehicle. By this structure the forward portions of the fender are given ample support and at the same time their installation is simplified, and it will be noted that it will be unnecessary to change the structure of the tractor to install these fenders thereon. It will be noted also that the dash 19 may be either drilled and tapped to receive the screws 36 at the time that the tractor is made, or such holes can be readily drilled in tractors which have already been built without affecting their usefulness or appearance.

It will be seen that I am, therefore, enabled to combine my pad supports with the fender, and I am further enabled to affect combination and inter-relation between the parts of my improved attachment by forming my tool box so that it does not materially affect the appearance of the fender as it apparently forms an integral part thereof, and as the tool box may also act as the sand pad, rest, step, or the like. I accomplish this combined purpose by flattening out the curve of the periphery-covering member 30 of the fender so that its rear edge will extend to position aligned with the rear ends of the arms 21 and the U brace member. Underneath this member 30 I then form my tool box.

It will be noted that there is an apron or flashing 37 along the outer edge of the member 30 of the fenders so that this flashing 37 by being widened forms the outer wall of my tool box. The inner wall of the tool box is formed by the vertical wall 29 of the fender. The rear wall of the tool box is formed by the member 30 and a suitable door of any type for the tool box, as at 38, may be provided in the said member 30. The front and bottom walls of my tool box are formed from a very heavy strip of sheet metal 39 which is bent at 40 so that the laterally extending portion may form the bottom of the tool box and the substantially vertically extending portion may form the front wall of the tool box. The side edges of this pad and tool box forming member 39 are turned in at 41 to form flanges which may be riveted to the flashing 37 and the wall 29 of the fender thereby both bracing the fender and closing the tool box. The rear edge of this member 39 is turned up to form the flange 42 which over-laps the turned in end 43 of the fender cover 30, thereby forming a double strength angle iron edge at the rear bottom corner of the fender and securing for this edge of the fender, in a large measure, the strength needed on account of the large number of accidental forces to which this portion of the fender is always subjected. The inner end of the bottom of the tool box, as formed by the laterally extending portion of the member 39, is reinforced by a portion 44 which may either be formed integral with this laterally extending portion or which may be suitably secured thereto and to the flanges 41 and 43 of the member 39. This plate 44 is attached thru the wall 29 of the fender to the arms 21 and the ends 25 of the U brace by the bolts or rivets 26 so that the bottom of the tool box which forms the sand pad, rest, step, or the like, is rigidly secured to the fender proper, to the tool box of which it forms a part, and to both brackets for supporting the pad, thereby giving to the pad for its support the benefit of the strength of all the parts of my attachment.

From the foregoing it will be seen that the strip 39, therefore, performs a number of functions among which may be mentioned its function in forming the sand pad, in re-inforcing the rear edge of the fender against accidental forces, and in forming part of the the tool box.

Extended across between the arms 21 so that the ends rest on the horizontal flanges of the arms 21 is a step device 45 consisting of a strip of sheet metal having its edges turned down to provide reinforcing flanges. This step device is riveted or otherwise secured at 46 to the arms 21 and similarly secured at 47 to both arms of the U brace member, so that the step further serves to interlock these brace members in addition to performing its function as a step by which the seat 20 of the tractor may be reached. It will be noted in this connection that the step is shown in dotted lines in Figure 2 simply to show its position relative to the other parts of my attachment and so that the construction of the remaining parts of the attachment would be more clearly illustrated. It will thus be noted that the arms 21 and U brace member are locked together by their attachment to the tractor, by their attachment to each other, and by their connection with the step 45. I consider this addition to the step 45 an important feature in adding to the strength of my pad supporting members and fenders; and the step also performs its function as a step so that I am enabled to secure a step for my attachment by using an advantageous brace member for such step.

Among the many advantages of my improved construction it should be specifically pointed out that I have secured an attachment for a tractor which combines inter-related multiple function parts adapted to form a combined fender, step, sand pad, and tool box for the tractor. Each member is inter-dependent upon the other so that parts of each co-operate to form parts of other members thereby lightening the structures and at the same time securing great strength and serviceability in proportion to the weight and complications of the parts used. It will also be noted that the reinforced rear edges of the fenders form bumpers which are less likely to injure things with which they come into contact than are the rotating cleats of the tractor wheels. Another important feature of my invention is that there is, apparently, no possibility that the tractor will rear up and turn over on the driver as I have been wholly unable to turn over a tractor rearwardly where it was equipped with these sand pads. A further advantage of the sand pads resides in the fact that they prevent the wheels from digging into the ground too far when the tractor is unable to move an object in soft ground. By providing these pads the tractor wheels will only dig themselves down a relatively short distance and they will not dig down so that the transmission housings rest so heavily on the ground that the tractor cannot run out from the holes made by its wheels under its own power if the ground be dug away slightly from in front of the wheels.

Further advantages may be pointed out from the provision of a pair of tool boxes wherein the driver may keep any tools or spare parts for either the tractor or implements associated therewith that he may desire, and the provision of fenders adapted to prevent accidental contact of the driver with the driving wheels of the tractor.

Other changes may be made in the arrangement and construction of the various parts of my improved device without departing from the spirit of the invention therein and it is my intention to cover by my claims such other changes as may be reasonably included within the scope thereof.

I claim as my invention:

1. In a tractor attachment for tractors having rear axle housings adjacent to either rear wheel, and a transmission housing having portions disposed below and between said axle housings, arms having their forward ends supported by and secured to the outer portions of the axle housings, a U brace having its central portion supported by and secured to said transmission housing, said U brace having its ends extended to position in contact with the rear ends of said arms, a combined brace and step member extended across the U brace to the arms and secured to both, and sand pads secured to and supported by the outer ends of said arms and U brace.

2. In a tractor attachment for tractors having rear axle housings, and a transmission housing having portions disposed below and between the rear axle housings, arms secured to the rear axle housing and extended rearwardly therefrom, other braces secured to said transmission housing and extending rearwardly and laterally therefrom, fenders having their vertical walls secured to said arms and having covered members with their rear edges extended to position adjacent to the ends of the arms and braces, and a strip of metal secured to the under side of the fender cover and to the arms and braces in position to co-operate with the parts mentioned and the vertical wall of the fender to form a combined fender reinforcement, sand pad, and tool box.

3. In a tractor attachment for tractors, a combined step, sand pad, fender, and tool box structure comprising supporting arms extending from the tractor, fenders mounted thereon, a combined step and brace member mounted on said arms, and an auxiliary strip of material associated with the fenders and arms to form a combined sand pad, brace, and tool box.

4. In a tractor attachment, fenders adapted to be carried by the tractor and rigidly supported therefrom, and a combined bumper, tool box, and sand pad device mounted on and secured to the rear portion of said fenders.

Dated Feb. 1, 1922.

WALTER T. FISHLEIGH.